Dec. 11, 1956   R. I. BINDER ET AL   2,773,575
MULTIPLE CLUTCH ARRANGEMENT
Filed June 2, 1953   4 Sheets-Sheet 3

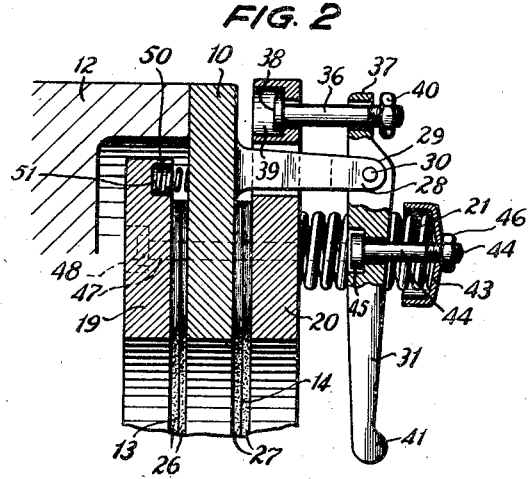
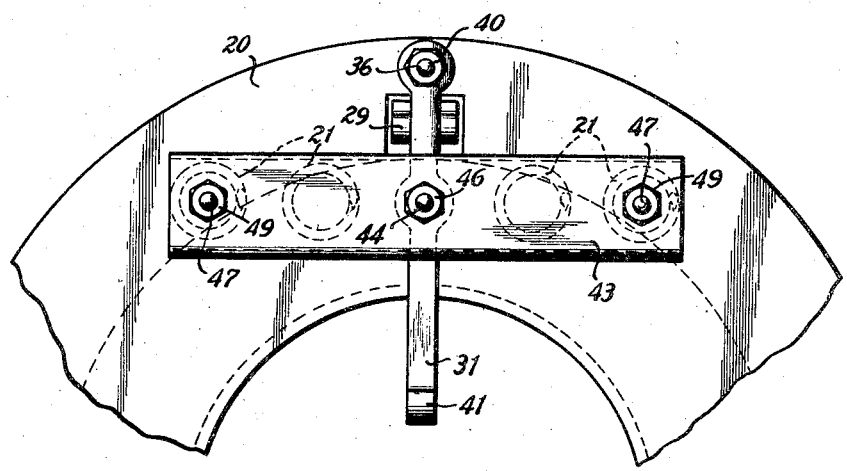

INVENTORS
Richard Binder
Adolf Ludwig
By Richardson, Davis and Worden
their ATTYS.

Dec. 11, 1956  R. I. BINDER ET AL  2,773,575
MULTIPLE CLUTCH ARRANGEMENT
Filed June 2, 1953  4 Sheets-Sheet 4

INVENTORS
Richard Binder
Adolf Ludwig
By Richardson Davidson Nordin
their ATTYS.

United States Patent Office 2,773,575
Patented Dec. 11, 1956

2,773,575

MULTIPLE CLUTCH ARRANGEMENT

Richard Ignatz Binder and Adolf Gustav Ludwig, Schweinfurt (Main), Germany, assignors to Firma Fichtel & Sachs A. G., Schweinfurt (Main), Germany Application June 2, 1953, Serial No. 359,058

Claims priority, application Germany February 4, 1953

8 Claims. (Cl. 192—48)

This invention relates to multiple clutch arrangements of the kind in which power transmission is selectively effected through one or both of two shafts, one of which is usually constructed as a solid shaft and the other as a hollow shaft disposed concentrically about the former.

In the case of farm tractors, for example, one of the clutches and its drive shaft are used for the propulsion of the vehicle, and the other to control a power take-off for the operation of various implements. Such double clutches are also used in connection with gear shifts to permit the shifting of gears under load, this type of the coupling making possible a change from one gear ratio to the other without interrupting the transmission of power. In conventional double clutches the sequence in which disengagement and engagement of the two drive shafts takes place is permanently and inalterably determined by the constructional design of the double clutch, no means being provided for conveniently changing this sequence after manufacture of the clutch has been completed.

Conventional double clutches are also ordinarily subject to the disadvantage that individual engagement or disengagement of one of the clutches is accompanied by a change in the pressure of driving engagement between the clutch members in the other clutch which remains under load. Additionally, in conventional double clutches, engagement and disengagement of one of the clutches is usually accompanied by axial movement of the other clutch which is under load.

The present invention is concerned with an improvement over such conventional double clutch arrangements and has for its object to provide for adjustment of certain adjustable members positioned between the coupling control levers and the pressure plates whereby the sequence of disengagement and engagement of the two clutches can be conveniently reversed whenever desired. The invention also provides for individual engagement and disengagement of one of the clutches without any appreciable increase in pressure on the other clutch and without axial movement of the other clutch while under load.

The accompanying drawings show some embodiments of a multiple clutch arrangement according to the invention.

Referring to the drawing:

Figure 2 is a fragmentary view in longitudinal section showing a modified form of construction for the simplified embodiment shown in Fig. 1.

Figure 3 is an end view of the fragment shown in Fig. 2.

Figure 1:
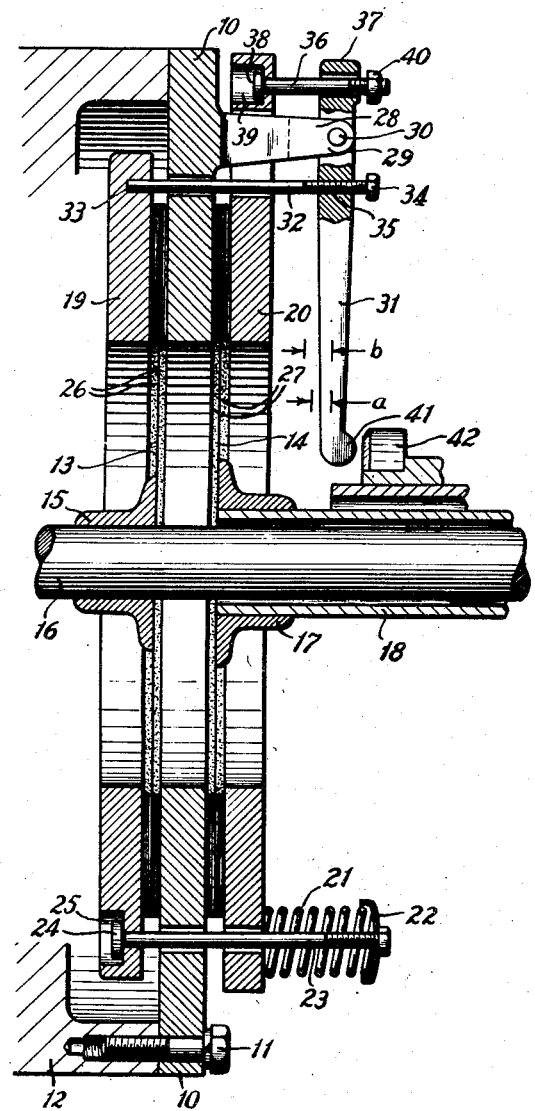
Figure 1 is a partial longitudinal sectional view of a simplified embodiment illustrating the principle of operation of the invention.

Referring to Fig. 1, a centrally apertured main clutch disc member 10 is shown secured by a series of bolts 11 to one side of an engine flywheel 12 to be driven thereby. Coaxially disposed adjacent to opposite sides of the main clutch member 10 are two mutually independent driven clutch members 13 and 14. The driven clutch member 13 is connected by a hub 15 to a solid drive shaft 16 and the other driven clutch member 14 is connected by a hub 17 to a hollow drive shaft 18 which encloses the solid shaft 16, the solid shaft 16 being coaxial with and freely rotatable with respect to the hollow shaft 18. The drive shafts 16 and 18 are each adapted to extend individually to two independent driven loads or power utilization devices, not shown.

Disposed on the inner or left side of main clutch member 10 is a centrally apertured inner pressure plate member 19 which is arranged to press the inner driven clutch member 13 into driving engagement with the inner side of the main clutch member 10. An independent outer pressure plate member 20 is arranged similarly to the inner pressure plate member 19 on the outer side of the main clutch member 10 for pressing the driven clutch member 14 into driving engagement with the outer side of the main clutch member 10.

A plurality of helical compression springs 21, of which only one is shown for simplicity of illustration, are disposed in an axially balanced symmetrical arrangement to press leftwardly against the outer side of the outer pressure plate 20. The outer end of each compression spring 21 bears against a retaining cup 22 which is connected by a tension bolt 23 to the inner pressure plate 19, the tension bolt 23 being provided with a head 24 recessed in a counterbore 25 on the inner side of the pressure plate 19. The tension bolt 23 passes freely slidably through the main clutch member 10 so that exactly equal pressures are applied to the two pressure plates 19 and 20 yieldingly urging them to press both of the driven clutch members 13 and 14 into simultaneous driving engagement with opposite sides of the main clutch member 10, through the action of clutch linings 26 fixed to driven clutch member 13 and the clutch linings 27 fixed to driven clutch member 14. The tension bolts 23 and other members described below which are fixed to or which pass both through main clutch member 10 and one or more of the pressure plates 19 and 20 constrain the main clutch member 10 and the two pressure plates 19 and 20 to rotate together as a unit.

A plurality of lugs 28 are symmetrically fixed to the main clutch member 10 and each lug 28 is bifurcated at its outer end at 29 and is provided with a transverse pivot pin 30 upon which a clutch control lever 31 is pivotally mounted intermediate its ends. For simplicity of illustration, only one of the lugs 28 and a single control lever 31 are shown in the drawing. The control levers 31 extend symmetrically and generally radially inwardly toward the common axis of the drive shafts 16 and 18 between the bifurcated end portions 29 of the lugs 28. Preferably three lugs 28 and three control levers 31 are used.

Threaded in each control lever 31 radially inwardly of its pivot 30 is a clutch actuating push rod 32 which extends freely slidably through main clutch member 1 to engage the bottom of a recess 33 formed in the inner pressure plate 19. The longitudinal position of each push rod 32 in its associated control lever 31 may be adjusted by turning a hexagonal bolt head 34 formed on its free end to rotate the externally threaded portion 35 of the push rod 32 and thereby adjust its longitudinal position relative to the control lever 31.

A clutch actuating bolt 36 connects the free end portion 37 of each control lever 31, located radially outwardly of pivot pin 30, to the outer pressure plate 20, the head 38 of each bolt 36 being disposed in a recess 39 formed on the inner side of the outer pressure plate 20. An adjusting nut 40 is threaded on the outer end portion of the bolt 36.

The inner rounded free ends 41 of the control lever 31 are simultaneously engageable by a clutch control collar member 42 which is axially movable with respect to the main clutch member 10.

In operation, as the collar member 42 moves toward the left, the inner free ends 41 of the control levers 31 are pressed toward the left, thereby rotating all of the control levers 31 on their respective pivot pins 30 with an accompanying leftward movement of the clutch actuating push rods 32. The inner ends of the push rods 32 are shown already in engagement with the bottoms of the recesses 33 in the inner pressure plate 19 and immediately cause the inner pressure plate 19 to move toward the left against the yielding pressure of the compression springs 21. Upon rotation of the control levers 31 through a predetermined small angle *a*, the driven clutch member 13 becomes fully disengaged from the main clutch member 10. At the same time, the pressure exerted by the compression springs 21 on outer pressure plate 20 is only slightly increased. This leaves the outer driven clutch member 14 in full and substantially unaffected driving engagement with main clutch member 10 while the inner driven clutch member 13 and the solid shaft 16 are disconnected from the main clutch member 10 and flywheel 12.

Further leftward movement of collar member 42 presses inner pressure plate 19 farther away from the inner driven clutch member 13 without any further effect, because the driven clutch member 13 is already disengaged. It also causes the outer free ends 37 of the control levers 31 to move further toward the right. After a sufficient amount of angular movement of the control levers 31 through an angle *b* which is appreciably greater than angle *a*, the adjusting nuts 40 are engaged by the outer end portions 37 of the control levers 31 and pull the outer pressure plate 20 toward the right away from driven clutch member 14 by means of the bolts 36. Both the inner and outer driven clutch members 19 and 20 thus become disengaged from the main clutch member 10. Both drive shafts 16 and 18 are then disconnected from the engine flywheel 12. When the collar member 42 is withdrawn toward the right, the driven clutch member 14 is first engaged by pressure plate 20 and, thereafter, the driven clutch member 13 is next engaged by pressure plate 19 so that both clutch members 13 and 14 are driven simultaneously by the main clutch member 10.

By adjustment of threaded push rods 32 so that their inner ends are spaced away from the bottoms of the recesses 33 in the inner pressure plate 6, and by adjustment of nuts 40 so that they are only slightly spaced from the outer end portions 37 of the control levers 31, the sequence of clutch operation will be reversed. With such an adjustment, outer pressure plate 20 will first be pulled away from driven clutch member 14 disconnecting the hollow shaft 18 before the push rods 32 force the inner pressure plate 19 away from driven clutch member 13 to disengage the solid shaft 16. The disengaging and engaging sequence between the two driven clutch members 13 and 14 may thus be reversed at will by turning the bolt heads 34 and adjusting nuts 40.

Referring to the modified embodiment of the invention shown in Figs. 2 and 3, a transversely extending rigid channel member 43 of U-shaped cross-section is connected to each control lever 31 by a centrally disposed tension bolt 44 having a head 45 recessed in the control lever 31. The rigid channel member 43 is axially spaced from the outer pressure plate 20 and the control lever 31 extends radially inwardly from pivot pin 30 between the rigid member 43 and the outer pressure plate 20. Each bolt 44 is provided with a nut 46 which bears against or is only slightly spaced from the outer surface of the channel member 43. A set of four compression springs 21 bears resiliently against the inner surface of each transverse rigid channel member 43 and against the outer surface of outer pressure plate 20, urging them apart. Two tension bolts 47 which pass through two of the compression springs 21 are disposed adjacent to opposite ends of each rigid member 43 and extend freely slidably through the main clutch member 10. They are provided at their inner ends with heads 48 recessed in the inner side of inner pressure plate 19 and transmit the force exerted by the outer ends of compression springs 21 to the inner pressure plate 19. Their outer ends are provided with nuts 49 which bear against rigid channel member 43.

Relatively weak helical compression springs 50 are disposed in recesses 51 formed in inner pressure plate 19 and bear resiliently against the inner side of the main clutch member 10. The compression springs 50 urge the inner pressure plate 19 away from the inner driven clutch member 13 to assure complete disengagement between inner driven clutch member 13 and main clutch member 10. When the inner free end of control levers 31 are moved toward the left, each rigid channel member 43 is pulled toward the left by its associated central bolt 44. This leftward pull releases the tension normally applied to the pair of end bolts 47 by the set of four compression springs 21 and permits the relatively weak compression springs 50 to move pressure plate 19 leftwardly thereby completely disengaging inner driven clutch member 13.

Continued pivotal movement of the control levers 31 will cause engagement between the free outer end portions 37 of the control levers 31 and the adjusting nuts 40 which are shown spaced therefrom. After engagement between the outer end portions 37 and the nuts 40, further pivotal movement of control levers 31 will cause the bolts 36 to pull the outer pressure plate 20 toward the right, thereby disengaging the main clutch member 10 from the outer driven clutch member 14.

As in Fig. 1, the sequence of engagement and disengagement between inner and outer driven clutch members 13 and 14 may be reversed by readjustment of nuts 40 to reduce their initial clearance from the outer ends 37 of the control levers 31. The nuts 46 on bolts 44 are then backed off to clear their respective rigid members 43 by a suitable distance so that a larger amount of angular displacement of control levers 31 is required before bolts 44 commence pulling their rigid channel members 43 toward the right than is required to commence the outward pulling of outer pressure plate member 20 away from main clutch member 10 by means of bolts 36. The sequence adjustment is thus similar to that described above for Fig. 1.

Figure 4:
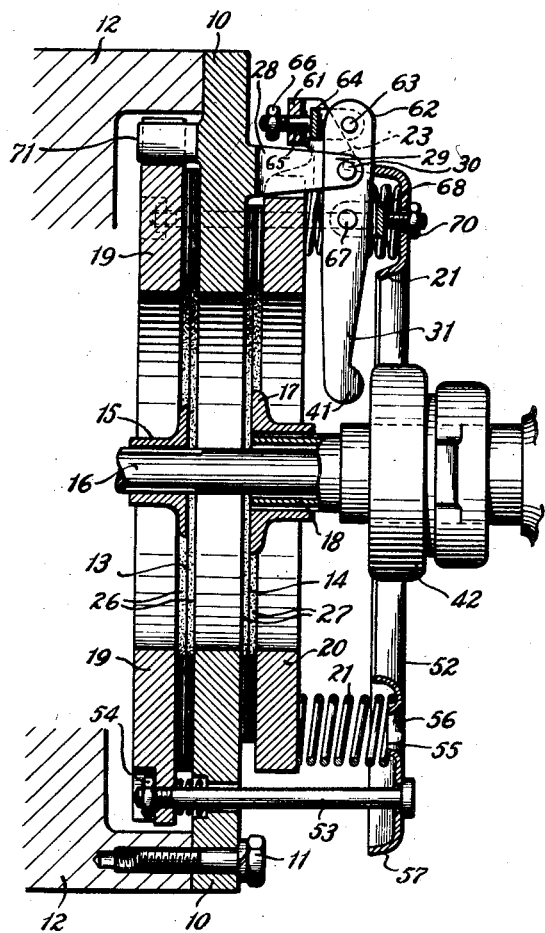
Figure 4 is a view in longitudinal section showing a further modified form of construction for the simplified embodiment of Fig. 1.
Figure 5:
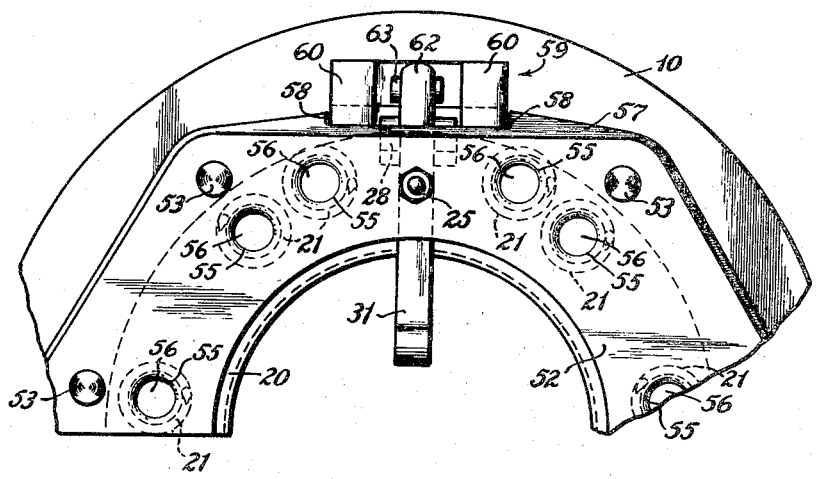
Figure 5 is a fragmentary end view of the modified embodiment of the invention shown in Fig. 4.

In another modified embodiment of the invention shown in Figs. 4 and 5, the outer side of the clutch is provided with a central aperture hexagonal rigid member or spring retaining plate 52 which is connected by a group of six headed bolts 53 to the inner pressure plate 19. The bolts 53 pass freely slidably through the main clutch member 10 and are provided with nuts 54 recessed in the inner pressure plate 19. The bolts 53 are maintained under tension by three sets of helical compression springs 21. Each set consists of four individual springs of which two are located radially inwardly of and adjacent to two of the bolts 53. The other two springs of each set are symmetrically laterally spaced at opposite sides of each of the three clutch control levers 31.

The outer end of each of the helical springs 21 surrounds an inwardly projecting circular lip 55 formed in the hexagonal spring retaining plate 52 around the edge of a punched circular aperture 56 so that the outer end of each compression spring 21 laterally is held in position by the circular lip 55. The inner end of each compression spring 21 is suitably positioned to press leftwardly against the pressure plate 20.

The hexagonal plate 52 is dished to form outer edges 57 extending toward the main clutch member 10, and the outer edges 57 are notched at 58 near each clutch control lever 31. Each notch is arranged for lateral guiding engagement with a bracket member 59. Each bracket member 59 is fixed to the outer pressure plate 20 by laterally spaced leg portions 60 which are interconnected adjacent to their outer ends by a transversely extending crosspiece 61. The clutch control lever 31 is of U-shaped cross-sectional configuration and its outer free end portion 62 is traversed by a pivot pin 63. Mounted on the pivot pin 63 is a link member 64 which is provided with an inwardly extending stud portion 65 which passes freely slidably through the cross-piece 61. The inner end of the stud 65 is threaded and carries an adjustment nut 66 which is spaced from and engageable with the inner side of the cross-piece 61 of bracket 59.

The clutch control lever 31 is also traversed by another pivot pin 67 located radially inwardly of the supporting pivot pin 30 on which the control lever 31 is pivotally mounted. A link member 68 is connected to the pivot pin 67 and is provided with an outwardly extending stud portion 69 which passes freely slidably through the spring retaining plate 52. The outer end of stud portion 69 is provided with an adjusting nut 70 which is normally slightly spaced from the outer surface of the spring retaining plate 52. Guide studs 71 are shown formed on the inner side of main clutch member 10 for guiding the axial movement of the inner pressure plate 19.

In operation, when the clutch control collar 42 moves toward the left and presses against the inner end portions 41 of the control levers 31, these levers are angularly displaced on their pivot pin 30 and the adjusting nuts 70 immediately pull the spring retaining plate 52 toward the left against the pressure of springs 21, thereby releasing the tension on the bolts 53. The small and relatively weak compression springs 50 then urge the inner pressure plate 19 away from the inner driven clutch member 13 so that the clutch member 13 is fully disengaged.

Further movement of collar 42 produces movement of the control levers 31 through a greater angle so that the adjusting nuts 66 bear against the cross-pieces 61 of the brackets 59 and pull the outer pressure plate 20 toward the right to disengage the outer driven clutch member 14. Both driven clutch members are then disengaged as in the other embodiments of the invention described above.

By turning the adjusting nuts 70 so that they are normally spaced away from the spring retaining plate 52 and by turning the adjusting nuts 66 so that they are normally only slightly spaced from the cross-pieces 61, the sequence of engagement and disengagement between the two driven clutch members 13 and 14 may be reversed.

The clutch may also be adjusted so that both driven clutch members engage and disengage substantially simultaneously. Simultaneous operation will disconnect the two loads from each other whenever they are disconnected from the main clutch member, thereby permitting one of the loads to be independently operated either manually or from some other power source, if desired, without the burden of the other load.

It will be apparent to those skilled in the art that many changes and modifications may be made in the specific illustrative embodiments of the invention which are herein shown and described without departing from the scope of the invention as defined in the appended claims.

What is claimed is:

1. In a double clutch of the class described, in combination with a main clutch member adapted to be rotated by driving means; two pressure plate means coaxially disposed in proximity to said main clutch member for rotation therewith and each independently axially movable with respect thereto, said pressure plate means being disposed to move axially in opposite directions toward said main clutch member; and two driven clutch members coaxially disposed with respect to said main clutch member, each driven clutch member comprising a portion extending intermediate said main clutch member and one of said pressure plate means and each independently adapted for individual connection to separate and independent power driven utilization means, the provision of: common resilient means acting simultaneously on both of said pressure plate means and urging both of said pressure plate means in opposite axial directions each toward said main clutch member to press both of said driven clutch members simultaneously and individually into driving engagement with said main clutch member; at least one generally radially extending clutch control lever; pivot means carried by said main clutch member and pivotally supporting said control lever intermediate its ends; a first clutch actuating means connected to one of said pressure plate means and connected to said control lever at one side of said pivot means and actuable by pivotal movement of said control lever through a first predetermined angle to cause axial movement of one of said pressure plate means against the action of said common resilient means away from said main clutch member to disengage one of said driven clutch members; a second clutch actuating means connected to the other of said pressure plate means and connected to said control lever at the other side of said pivot means and actuable by pivotal movement of said control lever through a second predetermined angle appreciably different from said first angle to cause axial movement of said other pressure plate means away from said main clutch member, whereby angular displacement of said control lever through the greater of said two angles will disengage both of said clutch members and displacement of said control lever through the lesser of said two angles will disengage only one of said clutch members.

2. The combination according to claim 1, in which said main clutch member is a disc, said pressure plate means being disposed on opposite sides of said disc, and wherein said resilient means comprises double-ended compression spring means arranged with one of its ends pressing to urge one of said pressure plate means toward said disc, said combination further comprising longitudinally movable tension means passing through said disc and connecting the other of said pressure plate means to the other end of said compression spring means to urge said other pressure plate means toward said disc.

3. The combination according to claim 2, in which one of said first and second clutch control means is a push rod passing through said disc for pushing one of said pressure plate members away from said disc and the other is a tension member connected to pull the other of said pressure plate members away from said disc.

4. In a double clutch of the class described, in combination with a main clutch member adapted to be rotated by driving means; two pressure plate means coaxially disposed in proximity to said main clutch member for rotation therewith and each independently axially movable with respect thereto, said pressure plate means being disposed to move axially in opposite directions toward said main clutch member; and two driven clutch members coaxially disposed with respect to said main clutch member, each driven clutch member comprising a portion extending intermediate said main clutch member and one of said pressure plate means and each adapted for individual connection to separate and independent power driven utilization means, the provision of: common resilient means acting simultaneously on both of said pressure plate means and urging both of said pressure plate means in opposite axial directions to press said driven clutch members simultaneously and independently into driving engagement with said main clutch means; at least one generally radially extending clutch control lever; pivot means carried by said main clutch member and pivotally supporting said clutch control lever intermediate its ends; a first clutch actuating means connecting said control lever at one side of said pivot means to one of said pressure plate means; a second clutch actuating means connecting said control lever at the other side of said pivot means to the other of said pressure plate means; and two independent adjustment means each included in one of said two clutch actuating means, whereby pivotal movement of said control lever through an angle determined independently by each of said adjustment means will cause axial movement of one of said pressure plate means to disengage the particular driven clutch member which it normally urges into driving engagement with said main clutch member under the influence of said common resilient means.

5. The combination according to claim 4, in which each of said first and second clutch actuating means comprises threaded means rotatable to vary the amount of angular movement of said control lever required to cause axial movement of said one of said pressure plate means, and wherein said adjustment means comprises means engageable for rotating said threaded means.

6. In a double clutch of the class described, in combination: a main clutch disc member adapted to be rotated by driving means; first and second independently axially movable pressure plate means coaxially disposed in proximity to said disc member for rotation therewith; two driven clutch members each comprising a portion interposed between one of said pressure plate means and one side of said main disc member; a rigid axially movable member spaced from said first pressure plate means; relatively strong resilient means acting on said rigid member and on said first pressure plate means and yieldingly urging them apart; tension means connected to said rigid member and to said second pressure plate means to transmit the force exerted by said resilient means from said rigid member to said second pressure plate means for yieldingly urging both of said pressure plate means simultaneously and independently toward said main disc member, each to press one of said driven clutch members into driving engagement with said main disc member; relatively weak resilient means urging said second pressure plate means away from said main disc member; at least one generally radially extending clutch control lever passing through the space between said rigid member and said first pressure plate means and pivoted intermediate its ends to said main disc member; a first clutch actuating member connecting a portion of said control lever located radially outwardly of said pivot to said first pressure plate means; and a second clutch actuating member connecting a portion of said control lever located radially inwardly of said pivot to said rigid member, whereby sufficient pivotal movement of said control lever will disengage both of said driven clutch members.

7. The combination according to claim 6, in which said rigid member is an axially movable plate, and wherein said relatively strong resilient means comprises a plurality of helical compression springs each having one end bearing against said first pressure plate means and its other end bearing against said plate to be retained thereby.

8. The combination according to claim 6, wherein each of said first and said second clutch actuating members comprises an adjustable bolt, whereby the amount of angular displacement of said control lever which is required to cause movement of said first pressure plate means and of said rigid member may be independently regulated by adjustment of said bolts to alter the sequence of engagement and disengagement between said driven clutch members and said main disc member.

References Cited in the file of this patent

UNITED STATES PATENTS

| 1,845,332 | Reece et al. | Feb. 16, 1932 |

FOREIGN PATENTS

| 635,042 | Great Britain | Mar. 29, 1950 |
| 662,848 | Germany | May 17, 1936 |